May 7, 1963 J. W. FODREA 3,088,336
TRANSMISSION
Original Filed Nov. 29, 1957 3 Sheets-Sheet 1

INVENTOR.
James W. Fodrea
BY
W. C. Middleton
ATTORNEY

May 7, 1963

J. W. FODREA 3,088,336

TRANSMISSION

Original Filed Nov. 29, 1957

INVENTOR.
James W. Fodrea
BY
W. C. Middleton
ATTORNEY

May 7, 1963  J. W. FODREA  3,088,336
TRANSMISSION
Original Filed Nov. 29, 1957  3 Sheets-Sheet 3

INVENTOR.
James W. Fodrea
BY
W.C. Middleton
ATTORNEY

United States Patent Office 3,088,336
Patented May 7, 1963

3,088,336
TRANSMISSION
James W. Fodrea, Rochester, Mich., assignor to General Motors Corporation, Detroit, Mich., a corporation of Delaware
Continuation of application Ser. No. 699,714, Nov. 29, 1957. This application Jan. 4, 1960, Ser. No. 451
22 Claims. (Cl. 74—745)

This invention relates to transmissions and more particularly a sliding gear fully synchronized four-speed and reverse transmission. This application is a continuation of abandoned S.N. 699,714, filed November 29, 1957.

This transmission provides four fully synchronized forward gear ratios and a reverse gear ratio. The input shaft is directly clutched to the output shaft to provide direct drive or fourth ratio. The countershaft which is continuously driven by the input shaft may be clutched through three separate spur gear sets to provide third, second and first ratios. The clutches which effect each of these ratios are fully synchronized. Two pairs of clutches are employed, one to effect third and fourth ratios and one to effect first and second ratios. The reverse gearing is located in the main transmission housing and an auxiliary transmission housing. The reverse countershaft gear is driven from the first ratio countershaft gear and is connected to the reverse gear by the reverse countershaft which extends through the wall separating the two sections of the housing.

An object of the invention is to provide in a four-speed fully synchronized transmission, a first synchronizing clutch assembly providing direct drive or fourth ratio in one position and third ratio in another position and a second synchronizing clutch assembly providing first ratio in one position and second ratio in another position.

Another object of the invention is to provide in a multiratio transmission having a main housing section and an auxiliary housing section, a multiratio gearing and synchronizing clutches to establish a plurality of forward ratios located in the main transmission housing and a reverse ratio gear drive employing a reverse ratio countershaft extending through the wall between said transmission sections and being driven from said forward gear mechanism in the main housing and connectible by a sliding gear to the output shaft in the auxiliary housing.

Another object of the invention is to provide in a transmission having a countershaft extending through a transmission wall a two-part sleeve gear mountable on a shaft extending between the supports on opposite sides of the wall.

These and other objects of the invention will be more apparent from the following description and drawings of the preferred embodiment of the invention.

Figure 1:
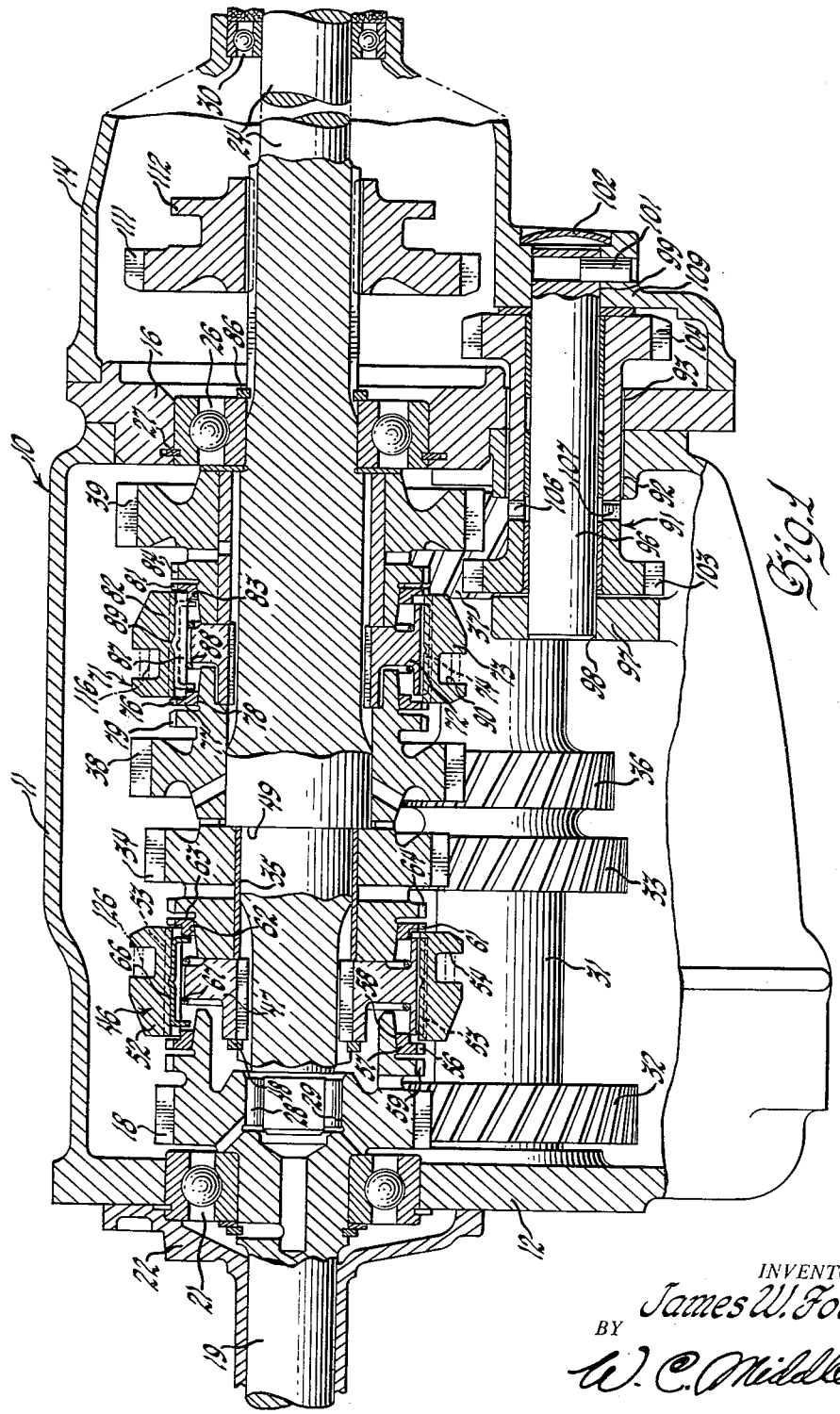
FIG. 1 is a view partially in section showing the transmission gearing.

The transmission has a housing 10 as shown in FIG. 1 having a main portion 11 having a forward end wall 12 and an auxiliary section 14 with a central or dividing and connecting wall 16 located between the main section 11 and the auxiliary section 14 and a rear end wall supporting bearing 30. Thus the dividing wall 16 provides a rear end wall for the main housing portion. Considering the complete transmission housing 10, there is a forward end wall 12, a rear end wall and a dividing or central wall 16 which provides a rear end wall for the forward gear chamber and a front end wall for the reverse gear chamber. The input gear 18 is formed integrally on the input shaft 19 which is rotatably mounted by the bearing 21 supported by the forward wall 12 of the housing and retained by the retainer 22. The output shaft 24 is rotatably supported at a central portion by a bearing 26 supported in the dividing wall 16 and retained therein by the snap ring 27 and at the forward end by a bearing 28 located in a pilot bore 29 in the rear end of the input shaft 19. The rear end of the output shaft 24 is rotatably supported and sealed by a sealed bearing 30 in the rear wall of the auxiliary housing.

A cluster gear 31 is supported in a conventional manner on a countershaft, not shown, supported in the front wall 12 and dividing wall 16. Cluster gear has a drive gear 32 meshing with an input gear 18 to continuously drive cluster gear 31. The cluster gear 31 also has a third ratio input gear 33 which meshes with a third ratio output gear 34 which is rotatably mounted by a bearing 35 on the output shaft 24. Cluster gear 31 also has a second ratio input gear 36 and a first ratio input gear 37 which mesh respectively with a second ratio output gear 38 and the first ratio output gear 39, both of which are rotatably mounted on the output shaft 24.

The third fourth ratio synchronizing clutch mechanism 46 located between the input gear 18 and the third ratio output gear 34 is moved forward to provide direct or fourth ratio and rearwardly to provide third ratio. The synchronizing assembly 46 includes a clutch hub 47 which is suitably splined to the output shaft 24 and retained in axial position by a snap ring 48 which holds both the hub 47 and the gear 34 against the shoulder 49. The clutch sleeve 52 is mounted for axial sliding movement on the hub 47 by the splines 53 and has an annular groove 54 to receive the third fourth shift fork 126. When the sleeve 52 is moved forward to engage direct drive the splines 53 on the sleeve first engage the blocker teeth 56 on the synchronizing ring 57 which is moved to engage the cone clutch surfaces 58 on the ring and gear 18 to obtain synchronization between the clutch sleeve 52 and clutch teeth 59 on the input gear 18 to permit further movement of the sleeve 52 so that the splines 53 engage the clutch teeth 59 to establish direct drive.

Similarly third ratio is established when the sleeve 52 is moved toward the third ratio gear 34. During this movement the splines 53 on the sleeve 52 first engage the blocker teeth 61 to move the synchronizing cone 62 to effect engagement of the cone clutch surfaces 63 to obtain synchronization before the spline 53 engages the clutch teeth 64 on the output gear 34 to establish third ratio drive. The sleeve 52 is resiliently held in neutral position by one or more keys 66 located in axial grooves located between the splines 53 in both the hub 47 and sleeve 52. The keys have on their outer surface a detent projection fitting a detent recess in the base of the groove in the sleeve. Annular springs 67 bias the keys outwardly so that the detent projection engages the detent recess and axially hold the key on the hub.

The first second ratio synchronizing device 71 is located between the first ratio output gear 39 and the second ratio output gear 38 and includes a hub 72 splined to the output shaft 24 and a sleeve 73 is connected by suitable splines 74 to the hub 72 to permit axial sliding of the sleeve and to provide a driving connection from the sleeve to the hub. To establish second ratio drive the sleeve 73 is moved forward so that the splines 74 engage the blocker teeth 76 on synchronizing ring 77 to engage the cone clutch surfaces 78 to establish synchronization for the splines 74 to engage the clutch teeth 79 on the second ratio gear 38. To establish first ratio drive sleeve 73 is moved rearwardly so that the splines 74 first engage the blocker teeth 81 on synchronizing ring 82 to move the ring to engage the cone surfaces 83 between the ring 82 and the gear 39 to effect synchronization before the splines 74 engage clutch teeth 84 to effect first ratio drive. The gear 38, hub 72 and gear 39 are axially located on the output shaft 24 between the gear 34 and the bearing 26 and retained in this position by a snap ring 86 adjacent bearing 26. One or more detent keys 87 similar to keys 66 are located between the splines 74 in the sleeve 73 and hub 72 by a pair of annular spring rings 88 and have a detent projection and recess 89 positioned as shown to hold the sleeve 73 in the neutral position. The first second shift fork 116 engages the recess 90.

The reverse countershaft assembly 91 passes freely through aperture 92 in a rear wall portion of the main transmission housing 11 and aperture 93 of the dividing wall 16. The reverse countershaft assembly consists of a countershaft 96 supported in bore 98 of support 97 which may be formed as a portion of the main transmission housing 11 and an aperture 99 formed in a wall 109 of the auxiliary transmission housing 14. A pin 101 fixes the shaft 96 in position. The reverse input gear 103 is rotatably mounted by suitable bearings on the shaft 96 and meshes with the first ratio countershaft gear 37. It will be noted that the first ratio countershaft gear 37 is sufficiently wide so that the gear 103 may be axially displaced with respect to the gear 39 to permit a transverse overlap so that the reverse countershaft assembly 91 may be located closer to the axis of the transmission. This enables a reduction in the transmission housing dimensions. The reverse output gear 104 is also rotatably mounted on suitable bearings on the countershaft 96 and has splines 106 mating with splines 107 on the gear 103 to provide a drive connection between these gears and to permit their assembly. The gears 103 and 104 are axially located by suitable thrust washers between the mounting 97 and a wall portion 109 of the auxiliary housing 14. The reverse gear 111 is suitably splined to the output shaft 24 for axial sliding movement and has an annular projection 112 engaged by reverse fork 146 to position the reverse gear 111 in the position shown to disconnect reverse and to slide it forward to engage the gear 104 to provide reverse drive.

Figure 2:
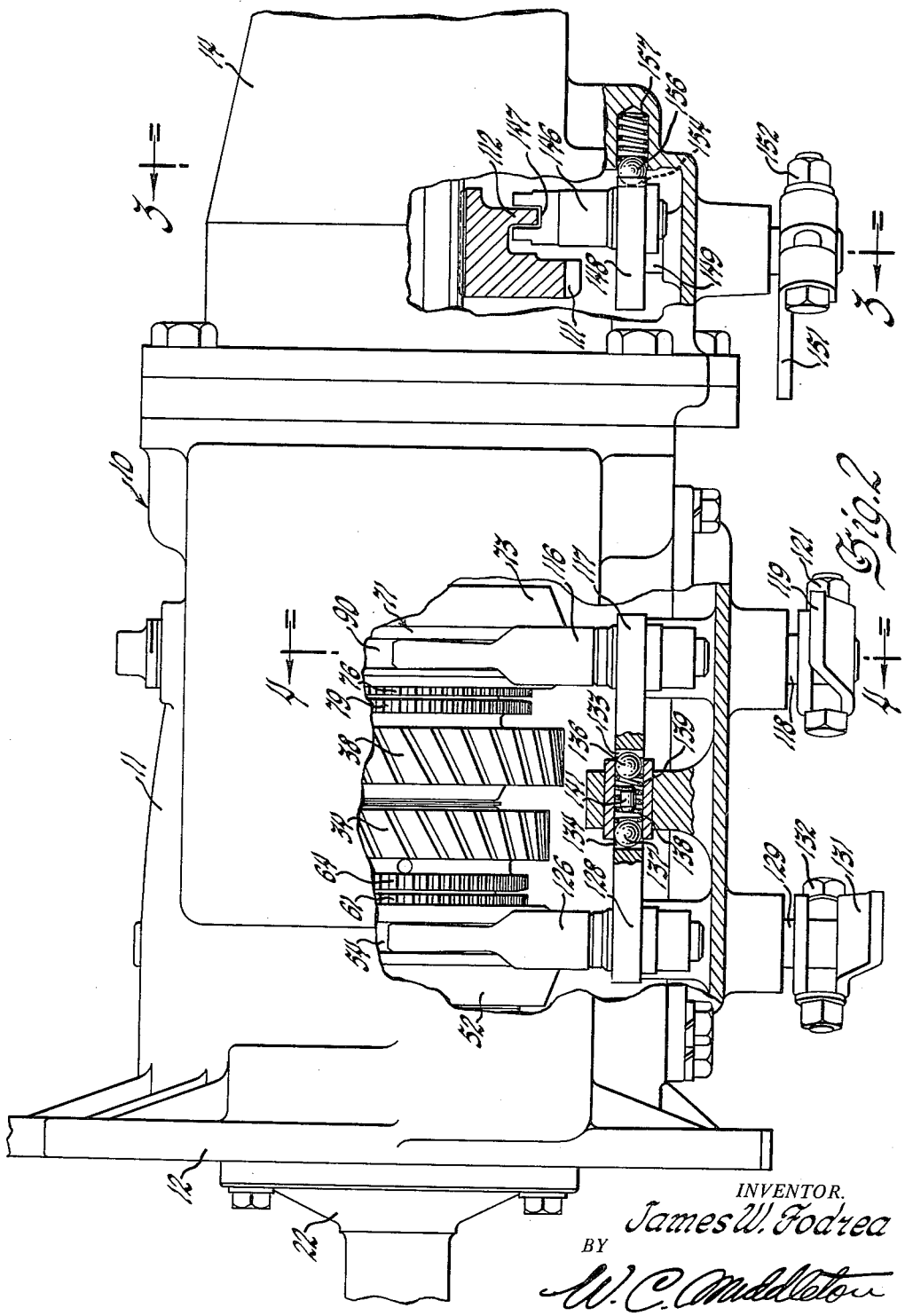
FIG. 2 is an elevation view of the transmission with parts broken away to show the transmission controls.
Figure 3:
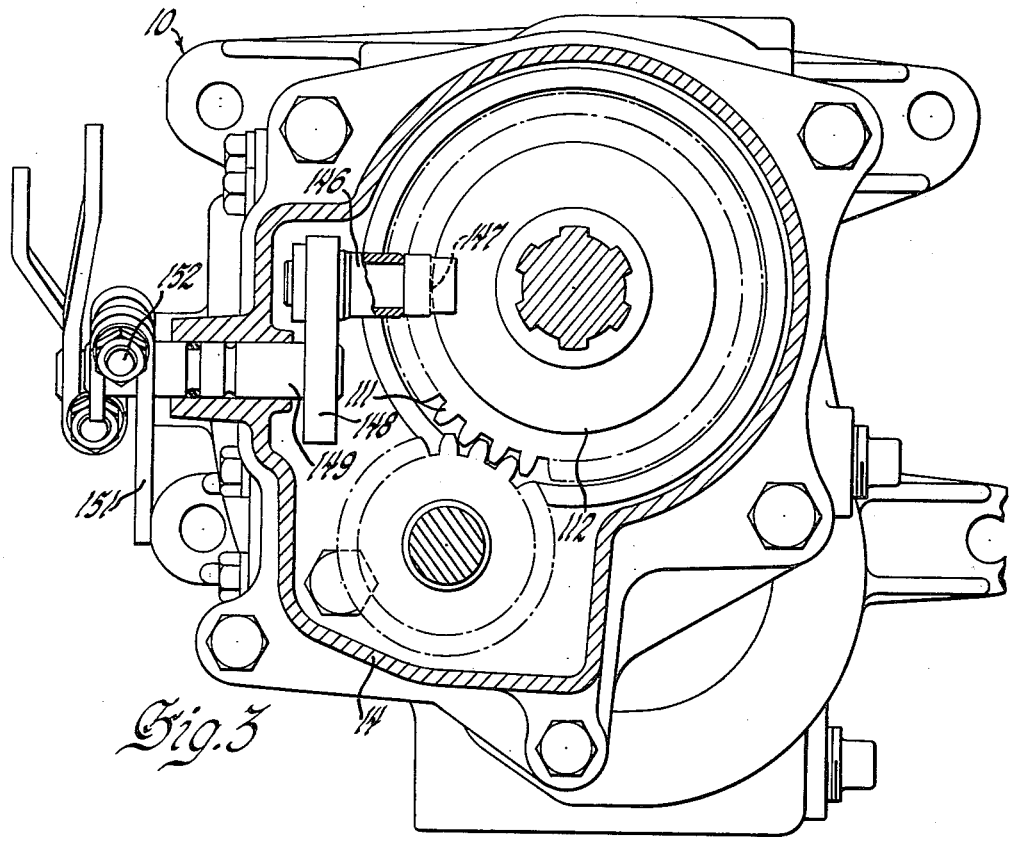
FIG. 3 is a sectional view of FIG. 2 on the line 3—3.
Figure 4:
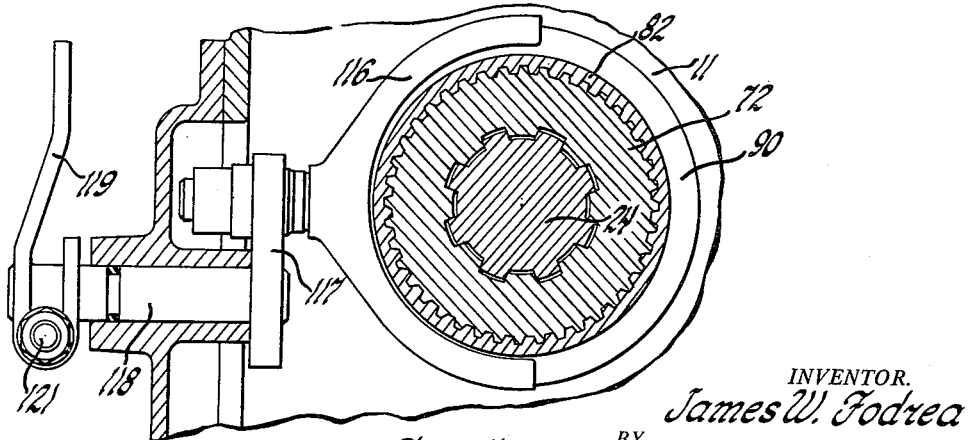
FIG. 4 is a sectional view of FIG. 2 on the line 4—4.

The first second shift fork 116 shown in FIGS. 2 and 4 fits in the groove 90 to actuate the sleeve 73 of the first second synchronizing mechanism 71. The fork 116 is rotatably mounted on a lever 117 which is fixed for rotation with the control shaft 118. The arm 119 which is actuated by the transmission control linkage is secured by an adjustable connection 121 to shaft 118 to rotate the lever 117 to move the fork 116 axially. The third and fourth ratio shift fork 126 similarly cooperates with the groove 54 of the third fourth ratio synchronizing mechanism 46. The fork 126 is rotatably connected to the lever 128 which is fixed to the control shaft 129. The third fourth ratio control lever 131 is suitably connected to the control linkage and connected by an adjustable connection 132 to rotate the control shaft 129, the lever 128 and axially move the fork 126. The levers 117 or 128 each have a circular surface each having one detent recess 133 and 134 cooperating with detent balls 136 and 137 respectively. The balls 136 and 137 have a spring 138 between them to resiliently urge the balls which are retained in bore 139 into the detent recesses. The interlock pin 141 located between the balls prevents movement of either lever 117 or 128 when the other is not in the neutral position to permit one ball to move into its recess.

The reverse shifter fork 146 has a recess 147 in the end fitting the annular projection 112 on the reverse gear 111 to axially shift the reverse gear. Fork 146 is pivotally connected to the lever 148 which is fixed to the control shaft 149 rotatably mounted in the auxiliary housing 14. The reverse control lever 151 is connected by an adjustable connection 152 to the shaft 149 to rotate the shaft and the lever 148 to axially move the fork 146 and the gear 111. The lever 148 has a surface 154, circular about the axis of shaft 149, having a detent recess cooperating with the ball 156 which is resiliently urged by spring 157 into the recess to provide a spring detent.

This transmission provides four forward fully synchronized speed ratios and one reverse ratio. Fourth speed or direct drive is provided by moving the synchronizing sleeve 52 forwardly to directly connect the input gear 18 to the output shaft 24. In the other ratios the drive is from the input shaft 19 through the input gear 18 and the drive gear 32 and the cluster gear 31 including the first, second and third ratio input gears. To provide third ratio synchronizing device 46 is moved rearwardly to clutch the third ratio drive gear 34 which is driven by the third ratio input gear 33 to the output shaft 24 effecting the third ratio drive. First and second ratios are provided respectively by moving the synchronizing device 71 rearwardly to connect the first ratio output gear 39 to output shaft 24 and by moving the synchronizing device 71 forward to connect a second rato output gear 38 to the output shaft 24. Reverse ratio is provided by moving the reverse gear 111 forwardly to mesh with the reverse countershaft gear 104. This establishes reverse drive through the reverse countershaft gears 104 and 103 and the cluster gear 37.

The reverse countershaft gearing is readily assembled by locating gears in position and inserting the shaft 96 through the aperture 99 in the auxiliary housing 14. When this is done the entire assembly is axially located for rotary movement. Then the pin 101 is inserted to lock the assembly in position and the cover 102 placed to seal the assembly.

The above description of the preferred embodiments of the invention is illustrative of the invention and may be modified by those skilled in the art within the scope of the appended claims.

I claim:

1. In a transmission, a main housing having a forward wall, an auxiliary housing located at the rear portion of said main housing and having a rear wall, a dividing wall located between said main and auxiliary housing and connecting said housing and having an aperture, an input shaft rotatably mounted in said forward wall and having an input gear in said main housing, an output shaft rotatably mounted and extending through said dividing wall, a cluster gear rotatably mounted in said main housing and rotatably supported on said forward wall and said dividing wall and having a drive gear meshing with said input gear and a ratio input gear, a ratio output gear rotatably mounted on said output shaft and meshing respectively with said ratio input gear, means located on said output shaft and movable to clutch said ratio output gear to said output shaft to provide a drive in one ratio, a countershaft fixedly supported within said main housing and said auxiliary housing and extending through said aperture in said dividing wall, said ratio input gear being wider than said ratio output gear to provide a free portion, an input idler gear rotatably mounted on said countershaft and positioned in said main housing in overlapping relation with said ratio output gear and meshing with said free portion of said ratio input gear, an output idler gear rotatably mounted on said countershaft and located in said auxiliary housing and detachably drivingly connected to said input idler gear, and a reverse gear splined to said output shaft in said auxiliary housing for axial sliding movement from a disengaged position to a position meshing with said output countershaft gear to provide reverse ratio.

2. In a transmission, a main housing having a forward wall, an auxiliary housing located at the rear portion of said main housing and having a rear wall, a dividing wall located between said main and auxiliary housing and connecting said housings, said dividing wall having an aperture, an input shaft rotatably mounted in said forward wall and having an input gear in said main housing, an output shaft rotatably mounted in said housings and extending through said dividing wall coaxially with said input shaft and having its forward end rotatably mounted on said input shaft, a cluster gear rotatably mounted in said main housing and rotatably supported on said forward wall and said dividing wall and having successively located a drive gear meshing with said input gear, third, second and first ratio input gears, third, second and first ratio output gears rotatably mounted on said output shaft and meshing respectively with said third, second and first ratio input gears, first synchronizing means located between said input gear and said third ratio output gear and having a member movable forwardly to clutch said input gear to said output shaft and rearwardly to clutch said third ratio output gear to said output shaft, second synchronizing means located on said output shaft between said second and first ratio output gears and movable forwardly to clutch said second ratio output gear to said output shaft and rearwardly to clutch said first ratio output gear to said output shaft, a countershaft fixedly supported within said main housing and said auxiliary housing and extending through said aperture in said dividing wall, said first ratio input gear being wider than said first ratio output gear to provide a free portion, an input idler gear rotatably mounted on said countershaft and positioned in said main housing in overlapping relation with said first ratio output gear and meshing with said free portion of said first ratio input gear, an output idler gear rotatably mounted on said countershaft and located in said auxiliary housing, said input and output idler gears being larger than said aperture, means extending through said aperture drivingly connecting said input and output idler gears, and a reverse gear splined to said output shaft in said auxiliary housing for axial sliding movement from a disengaged position to a position meshing with said output countershaft gear to provide reverse ratio.

3. In a transmission, a housing, a dividing wall located between the ends of said housing, said dividing wall having an aperture, one shaft rotatably mounted in said housing on one side of said dividing wall, another shaft rotatably mounted in said housing on the other side of said dividing wall, a countershaft, said housing having means to axially receive and support said countershaft in said housing in a position extending through said aperture in said dividing wall, one and another idler gear each having a larger diameter than said aperture and each having means to axially receive said countershaft and to support said idler gears on said countershaft, said one idler gear being located on said one side of said dividing wall, means drivingly connecting said one shaft to said one idler gear, said other idler gear being located on said other side of said dividing wall, disconnectible drive means connecting said other idler gear and said other shaft to provide a disconnectible drive connection, detachable means drivingly connecting said one and said another idler gears, thrust bearing means on said housing directly engaging said idler gears to axially locate said idler gears.

4. In a transmission, a housing, a dividing wall located between the ends of said housing, said dividing wall having an aperture, one shaft rotatably mounted in said housing on one side of said dividing wall, another shaft rotatably mounted in said housing on the other side of said dividing wall, a countershaft, said housing having means to axially receive and support said countershaft in said housing in an axially fixed position extending through said aperture in said dividing wall, one and another idler gear each having a larger diameter than said aperture and each having means to axially slidably receive said countershaft and to rotatably support said idler gears on said countershaft, said one idler gear being located on said one side of said dividing wall, means drivingly connecting said one shaft to said one idler gear, said other idler gear being located on said other side of said dividing wall, said idler gears and countershaft being unsupported by said dividing wall, disconnectible drive means connecting said other idler gear and said other shaft to provide a disconnectible drive connection, detachable means including engaging formations on said idler gears providing a rotary drive and permitting relative axial movement between said idler gears drivingly connecting said one and said another idler gears, thrust bearing means on said housing directly engaging opposite end surfaces of said idler gears to axially position said idler gears and to hold said detachable means engaged.

5. In a transmission, a housing having a dividing wall located between the ends of said housing, said dividing wall having an aperture, an input shaft rotatably mounted in said housing on one side of said dividing wall, an output shaft rotatably mounted in said housing and having a portion on the other side of said dividing wall, a countershaft, said housing having means to axially receive and fixedly support said countershaft in said housing in a position extending through said aperture in said dividing wall, input and output idler gears having bores to axially receive and mount said input and output idler gears on said countershaft, said input idler gear being located on said one side of said dividing wall, means drivingly connecting said input shaft to said input idler gear, said output idler gear located on said other side of said dividing wall and detachably drivingly connected to said input idler gear, said housing having thrust bearing means directly engaging said input and output idler gears to axially locate said input and output idler gears, and a gear splined to said output shaft on said other side of said dividing wall for axial sliding movement from a disengaged position to a position meshing with said output idler gear to provide a ratio.

6. In a transmission, a housing having end walls and a dividing wall located between said end walls of said housing, one of said end walls and said dividing wall having aligned apertures, an input shaft rotatably mounted in said housing on one side of said dividing wall opposite to said one end wall, an output shaft rotatably mounted in said housing and having a portion on the other side of said dividing wall, a countershaft supported on said housing in said one side and extending through said aperture in said dividing wall and supported in said aperture in said one of said end walls, an input idler gear rotatably mounted on said countershaft and located on said one side of said dividing wall, means drivingly connecting said input shaft to said input idler gear, an output idler gear rotatably mounted on said countershaft and located on said other side of said dividing wall, drive means connected to said idler gear providing a rotary drive connection in one relative position of said idler gears and being disconnectible on relative axial movement from said position to drivingly connect said input idler gear to said output idler gear, thrust bearing means on said housing directly engaging opposite end surface portions, said input and output idler gears preventing lateral movement of said input and output idler gears and to hold said input and output idler gears together to engage said drive means, and a gear splined to said output shaft on said other side of said dividing wall for axial sliding movement from a disengaged position to a position meshing with said output idler gear to provide a ratio.

7. In a transmission, a housing having a dividing wall located between the ends of said housing, said dividing wall having an aperture, an input shaft rotatably mounted in said housing on one side of said dividing wall, an output shaft rotatably mounted in said housing and having a portion on the other side of said dividing wall, a countershaft fixedly supported in said housing and extending through said aperture in said dividing wall, an input idler gear rotatably mounted on said countershaft and located on said one side of said dividing wall, means drivingly connecting said input shaft to said input idler gear, an output idler gear rotatably mounted on said countershaft and located on said other side of said dividing wall, said input and output idler gears being larger than said aperture, detachable sleeve means mounted on said countershaft extending through said aperture and drivingly connecting said input idler gear to said output idler gear, thrust bearing means on said housing directly engaging said input and output idler gears to prevent lateral movement of said input and output idler gears, and a gear splined to said output shaft on said other side of said dividing wall for axial sliding movement from a disengaged position to a position meshing with said output idler gear to provide a ratio.

8. In a transmission, a main housing having a forward wall, an auxiliary housing located at the rear portion of said main housing and having a rear wall, a dividing wall located between said main and auxiliary housings connecting said housings together and having an aperture, an input shaft rotatably mounted in said main housing, an output shaft rotatably mounted in said main and auxiliary housings and extending through said dividing wall, means located in said main housing connecting said input and output shafts in a plurality of speed ratios, a countershaft fixedly supported within said main housing and said auxiliary housing and extending freely through said aperture in said dividing wall, an input idler gear rotatably mounted on said countershaft by bearing means permitting axial movement and located in said main housing, means drivingly connecting said input idler gear to said input shaft, an output idler gear rotatably mounted on said countershaft by bearing means permitting axial movement and located in said auxiliary housing, said idler gears being larger than said aperture, sleeve means rotatably mounted on said countershaft by means permitting axial movement and extending through said aperture detachably drivingly connecting said input idler gear to said output idler gear mounted on said countershaft, and a reverse gear splined to said output shaft in said auxiliary housing for axial sliding movement from a disengaged position to a position meshing with said output idler gear to provide reverse ratio.

9. In a transmission, a main housing having a forward wall, an auxiliary housing located at the rear portion of said main housing and having a rear wall, a dividing wall located between said main and auxiliary housings connecting said housings and having an aperture, an input shaft rotatably mounted in said main housing, an output shaft rotatably mounted in said housings and extending through said dividing wall, means located in said main housing connecting said input and output shafts in a plurality of speed ratios, a countershaft, said housings having means to axially receive and fixedly support said countershaft within said main housing and said auxiliary housing in a position extending through said aperture in said dividing wall, an input idler gear and an output idler gear having means to axially receive and rotatably mount said input and output gears on said countershaft, said input idler gear being mounted in said main housing on said countershaft, means drivingly connecting said input idler gear to said input shaft, said output idler gear being located in said auxiliary housing, said idler gears being larger than said aperture, means extending through said aperture detachablby drivingly connecting said input idler gear to said output idler gear, said housing having thrust bearing means directly engaging said input and output idler gears to axially locate said input and output idler gears, and a reverse gear splined to said output shaft in said auxiliary housing for axial sliding movement from a disengaged position to a position meshing with said output idler gear to provide reverse ratio.

10. In a transmission, a main housing having a forward wall, an auxiliary housing located at the rear portion of said main housing and having a rear wall, a dividing wall located between said main and auxiliary housings and connecting said housings, said dividing wall having an aperture, an input shaft rotatably mounted in said forward wall and having an input gear in said main housing, an output shaft in said housings rotatably mounted on and extending through said dividing wall, gear means located in said main housing selectively connecting said input gear and said output shaft in at least two forward speed ratios and including a driven gear connected at all times to said input gear, a countershaft supported within said main housing and said auxiliary housing and extending through said aperture in said dividing wall, an input idler rotatably mounted on said countershaft by bearing means permitting axial movement and meshing with said driven gear, an output idler gear rotatably mounted on said countershaft by bearing means permitting axial movement and located in said auxiliary housing, said housings having thrust bearing means directly engaging said input and output idler gears to axially located said input and output idler gears, said idler gears being larger than said aperture, means extending through said aperture drivingly connecting said input idler gear to said output idler gear, and a reverse gear splined to said output shaft in said auxiliary housing for axial sliding movement from a disengaged position to a position meshing with said output idler gear to provide reverse ratio.

11. In a transmission, a main housing having a forward wall, an auxiliary housing located at the rear portion of said main housing and having a rear wall, a dividing wall located between said main and auxiliary housings and connecting said housings, said dividing wall and rear wall having aligned apertures, an input shaft rotatably mounted in said forward wall and having an input gear in said main housing, an output shaft rotatably mounted on and extending through said dividing wall, gear means located in said main housing selectively connecting said input gear and said output shaft in at least two forward speed ratios and including a driven gear connected at all times to said input gear, a countershaft, said housings having means to axially receive said countershaft through said aperture in said rear wall and to support and axially position said countershaft within said main housing and said auxiliary housing extending through said aperture in said dividing wall and supported in said aperture in said rear wall, an input idler gear and an output idler gear having means to axially receive said countershaft to support said input and output idler gears on said countershaft, said input idler gear being mounted on said countershaft by means permitting relative axial movement and located in said main housing and meshing with said driven gear, said output idler gear being mounted on said countershaft by means permitting relative axial movement and located in said auxiliary housing, said idler gears being larger than said aperture in said dividing wall, means extending through said aperture drivingly connecting said input idler gear to said output idler gear, thrust means including wall portions of said housings directly engaging said input and output idler gears to axially position said input and output idler gears on said countershaft, and a reverse gear splined to said output shaft in said auxiliary housing for axial sliding movement from a disengaged position to a position meshing with said output idler gear to provide reverse ratio.

12. In a transmission, a housing having a forward gear chamber and a reverse gear chamber including end walls and a central wall between said chambers, an input gear rotatably mounted on one end wall and located in said forward gear chamber, an output shaft coaxially rotatably supported on said input gear, central wall and other end wall and extending through said reverse gear chamber and into said forward gear chamber, a forward countershaft rotatably mounted on said one end wall and said central wall and located only in said forward gear chamber and having a driving gear continuously meshing with said input gear to drive said forward countershaft and having three forward ratio countershaft gears continuously driven by said forward countershaft, three forward ratio output gears each continuously meshing with a corresponding forward ratio countershaft gear and rotatably mounted on said output shaft only in said forward gear chamber, a first hub fixed to said output shaft between said input gear and the first forward ratio output gear, a second hub between the second and third forward ratio output gears, clutch means on each hub to selectively connect the adjacent gears at each side of each hub to said output shaft, said input gear being located closely adjacent said first hub, said forward ratio output gears and hubs abutting each other, the input gear being in thrust bearing engagement with said one end wall, said third forward ratio output gear being in thrust bearing engagement with said central wall, a reverse countershaft rotatably mounted on said housing having a portion in said forward gear chamber, a portion extending through said central wall and a portion in said reverse gear chamber, drive gear means located only in said forward gear chamber meshing with one of said forward ratio countershaft gears connecting said forward and reverse countershafts, a reverse gear driven by said reverse countershaft located in said reverse gear chamber, and means in said reverse gear chamber operatively connecting said reverse gear to said output shaft.

13. In a transmission, a housing having a forward gear chamber and a reverse gear chamber including end walls and a central wall between said chambers, an input gear rotatably mounted on one end wall and located in said forward gear chamber, an output shaft coaxially rotatably supported on said input gear, central wall and other end wall and extending through said reverse gear chamber and into said forward gear chamber, a forward countershaft rotatably mounted on said one end wall and said central wall and located only in said forward gear chamber and having a driving gear continuously meshing with said input gear to drive said forward countershaft and having a plurality of forward ratio countershaft gears continuously driven by said forward countershaft, a plurality of forward ratio output gears each continuously meshing with a corresponding forward ratio countershaft gear and rotatably mounted on said output shaft only in said forward gear chamber, a first hub fixed to said output shaft between said input gear and the first forward ratio output gear, another hub between each additional pair of forward ratio output gears, clutch means on each hub to selectively connect the adjacent gears to said output shaft, said input gear being located closely adjacent said first hub, said forward ratio output gears and hubs abutting each other, the input gear being in thrust bearing engagement with said one end wall, the last forward ratio output gear being in thrust bearing engagement with said central wall, reverse countershaft means rotatably mounted on said housing having a portion in said forward gear chamber, a portion extending through said central wall and a portion in said reverse gear chamber, drive gear means located in said forward gear chamber connecting said forward and reverse countershafts, a reverse gear driven by said reverse countershaft located in said reverse gear chamber, and means in said reverse gear chamber operatively connecting said reverse gear to said output shaft.

14. In a transmission, a housing providing a gear chamber including end walls, an input gear rotatably mounted on one end wall and located in said forward gear chamber, an output shaft coaxially rotatably supported on said input gear and other end wall and extending into said gear chamber, a forward countershaft rotatably mounted on said end walls and located only in said gear chamber and having a driving gear continuously meshing with said input gear to drive said forward countershaft and having three forward ratio countershaft gears continuously driven by said forward countershaft, three forward ratio output gears each continuously meshing with a corresponding forward ratio countershaft gear and rotatably mounted on said output shaft only in said gear chamber, a first hub fixed to said output shaft between said input gear and the first forward ratio output gear, a second hub between the second and third forward ratio output gears, clutch means on each hub to selectively connect the adjacent gears at each side of each hub to said output shaft, said input gear being located closely adjacent said first hub, said forward ratio output gears and hubs abutting each other, the input gear being in thrust bearing engagement with said one end wall, said third forward ratio output gear being in thrust bearing engagement with said other end wall, a reverse countershaft rotatably mounted on said housing having a portion in said gear chamber, a portion extending through said other end wall, drive gear means located in said forward gear chamber connecting said forward and reverse countershafts, a reverse gear located outside of said gear chamber on said reverse countershaft, and means located outside of said gear chamber operatively connecting said reverse gear to said output shaft.

15. In a transmission, a housing having a forward gear chamber and a reverse gear chamber including end walls and a central wall between said chambers, an input gear rotatably mounted on one end wall and located in said forward gear chamber, an output shaft coaxially rotatably supported on said input gear and the other end wall and extending through said reverse gear chamber and into said forward gear chamber, a forward countershaft rotatably mounted on said one end wall and said central wall and located only in said forward gear chamber having a driving gear continuously meshing with said input gear to drive said forward countershaft, forward drive gearing including at least one forward ratio countershaft gear on said forward countershaft and continuously driven by said forward countershaft, a forward ratio output gear continuously meshing with said corresponding forward ratio countershaft gear and rotatably mounted on said output shaft only in said forward gear chamber, clutch means including a hub fixed to said output shaft between said input gear and said forward ratio output gear to selectively connect said input gear to said output shaft and said forward ratio output gear to said output shaft, said input gear being located closely adjacent said hub, the input gear being in thrust bearing engagement with said one end wall, said forward ratio output gear and clutch means abutting each other and the one most remote from said input member being in thrust bearing engagement with said central wall, a reverse countershaft rotatably mounted on said housing having a portion in said forward gear chamber, a portion extending through said central wall and a portion in said reverse gear chamber, drive means located in said forward gear chamber connecting said forward and reverse countershafts, a reverse gear driven by said reverse countershaft and located in said reverse gear chamber, and means in said reverse gear chamber selectively operatively connecting said reverse gear to said output shaft.

16. In a transmission, a housing providing a gear chamber including end walls, an input gear rotatably mounted on one end wall and located in said gear chamber, an output shaft coaxially rotatably supported on said input gear and the other end wall and extending into said gear chamber, a forward countershaft rotatably mounted on said end walls and located only in said gear chamber and having a driving gear continuously meshing with said input gear to drive said forward countershaft, forward drive gearing located in said gear chamber including at least one forward ratio countershaft gear on said forward countershaft and continuously driven by said forward countershaft, a forward ratio output gear continuously meshing with said corresponding forward ratio countershaft gear and rotatably mounted on said output shaft in said gear chamber, clutch means including a hub fixed to said output shaft between said input gear and said forward ratio output gear to selectively connect said input gear to said output shaft and said forward ratio output gear to said output shaft, said input gear being located closely adjacent said hub, the input gear being in thrust bearing engagement with said one end wall, said forward ratio output gear and clutch means abutting each other and the one most remote from said input member being in thrust bearing engagement with said central wall, a reverse countershaft rotatably mounted on said housing having a portion in said gear chamber, a portion extending through the other end wall and a portion outside of said gear chamber, drive gear means located in said gear chamber connecting said forward and reverse countershafts, a reverse gear driven by said reverse countershaft and located outside of said gear chamber, and means located outside of said gear chamber selectively operatively connecting said reverse gear to said output shaft.

17. In a transmission, a housing providing a gear chamber including end walls, an input gear rotatably mounted on one end wall and located in said gear chamber, an output shaft coaxially rotatably supported on said input gear and the other end wall and extending into said gear chamber, a forward countershaft rotatably mounted on said end walls and located in said gear chamber having a driving gear continuously meshing with said input gear to drive said forward countershaft, forward drive gearing located only in said gear chamber including at least one forward ratio countershaft gear on said forward countershaft and continuously driven by said forward countershaft, forward ratio output gear means located only in said gear chamber including a forward ratio output gear continuously meshing with said corresponding forward ratio countershaft gear and rotatably mounted on said output shaft in said gear chamber, clutch means including a hub fixed to said output shaft between said input gear and said forward ratio output gear to selectively connect said input gear to said output shaft and said forward ratio output gear to said output shaft, a reverse countershaft rotatably mounted on said housing having a portion outside of said gear chamber, drive gear means located in said gear chamber meshing with said forward ratio countershaft gear connecting said forward and reverse countershafts, a reverse gear driven by said reverse countershaft and located outside of said gear chamber, and means located outside of said gear chamber operatively connecting said reverse gear to said output shaft.

18. In a transmission; a housing providing a gear chamber and including end walls; an input gear rotatably mounted on one end wall and located in said gear chamber; an output shaft coaxially rotatably supported on said input gear and the other end wall and extending into said gear chamber, forward drive output gear means mounted on said output shaft and located only in said gear chamber and including a forward drive gear member rotatably mounted on said output shaft and including a hub member fixed to said output shaft located between said input gear and said forward drive gear member, clutch means on said hub for selectively connecting said forward drive gear member to said hub and said input gear to said hub, thrust bearing means locating said input gear and said hub with only sufficient clearance for relative rotation, thrust bearing means locating said forward drive gear member and said intermediate hub member with only sufficient clearance for relative rotation; said input gear and the last of said members having thrust bearing engagement respectively with said one and the other end wall and being spaced from said walls with just sufficient clearance for relative rotation to reduce the span of said output shaft to a minimum, said forward drive output gear means constituting the only gear means on said output shaft between said end walls to reduce the weight and moment of inertia of the output shaft and forward drive output gear means between said end walls to a minimum; a forward countershaft rotatably mounted on said end walls and located entirely in said gear chamber having a driving gear continuously meshing with said input gear to drive said countershaft and a countershaft gear fixed on said forward countershaft and drivingly connected to said forward drive output gear member; a reverse countershaft rotatably mounted on said housing having a portion inside of said gear chamber and a portion outside of said gear chamber; gear means on said forward and reverse countershafts located entirely in said gear chamber to connect said forward countershaft to drive said reverse countershaft; a reverse gear driven by said reverse countershaft located outside of said gear chamber; and means located outside of said gear chamber selectively operatively connecting said reverse gear to said output shaft.

19. In a transmission; a housing providing a gear chamber and including end walls; an input gear rotatably mounted on one end wall and located in said gear chamber; an output shaft coaxially rotatably supported on said input gear and the other end wall and extending into said gear chamber, forward drive output gear means mounted on said output shaft and located only in said gear chamber and including three forward drive gear members rotatably mounted on said output shaft and including a first hub member fixed to said output shaft located between said input gear and a first forward drive gear member and a second hub member fixed to said output shaft between the second and third forward drive gear members, synchronizing clutch means on said hubs to selectively connect each of said input gear and said forward drive gear members to a hub, thrust bearing means locating said input gear and said hub with only sufficient clearance for relative rotation, thrust bearing means locating said forward drive gear member and said intermediate hub member with only sufficient clearance for relative rotation; said input gear and the last of said members having thrust bearing engagement respectively with said one and the other end wall and being spaced from said walls with just sufficient clearance for relative rotation to reduce the span of said output shaft to a minimum, said forward drive output gear means constituting the only gear means on said output shaft between said end walls to reduce the weight and moment of inertia of the output shaft and forward drive output gear means between said end walls to a minimum; a forward sleeve countershaft rotatably mounted on a bearing shaft mounted on said end walls and located entirely in said gear chamber having a driving gear continuously meshing with said input gear to drive said countershaft and a countershaft gear fixed on said forward countershaft and drivingly connected to said forward drive output gear member; a reverse countershaft having a reverse countershaft input gear driven by a said countershaft gear and rotatably mounted on a bearing shaft mounted on said housing having a portion inside of said gear chamber and a portion outside of said gear chamber; a reverse gear driven by said reverse countershaft located outside of said gear chamber; and means located outside of said gear chamber operatively connecting said reverse gear to said output shaft.

20. In a transmission, a housing having end walls and a central wall providing separate forward and reverse gear chambers, an input member rotatably supported on the end wall of said forward gear chamber and located only in said forward gear chamber, an output member rotatably supported on said input member, said central wall and the other end wall, a forward countershaft supported only on said end wall of said forward gear chamber and said central wall and having all forward countershaft gears supported only in said forward gear chamber, a reverse countershaft supported on said housing and being located in both said forward gear chamber and said reverse gear chamber, gear means on said forward and reverse countershafts located only in said forward gear chamber to connect said forward countershaft to drive said reverse countershaft, forward gear means located only in said forward gear chamber on said output member and including at least one gear and one hub connecting said forward countershaft gears to said output member only in a plurality of forward speed ratios to provide a minimum weight forward gear means, all of said gears and hubs being in consecutive thrust bearing engagement to reduce the length of said forward gear means to a minimum, thrust bearing means locating said input member and forward gear means for minimum axial spacing, said end wall of said forward gear chamber and said central wall supporting the input member and output member portion supporting said forward gear means in close proximity to provide a minimum unsupported length of said output member, and reverse gear means located only in said reverse gear chamber operatively connecting said reverse countershaft to said output member.

21. In a transmission; a housing having end walls and a central wall providing separate forward and reverse gear chambers; an input member rotatably suported on the end wall of said forward gear chamber and located only in said forward gear chamber; an output member located in both gear chambers rotatably supported on said input member, said central wall and the other end wall; a forward countershaft having forward countershaft gears located only in said forward gear chamber rotatably supported on said one end wall and said central wall; gear means connecting said input member to drive said forward countershaft; forward output gear means for selectively connecting said countershaft gears to said output member only in a plurality of forward speed ratios; said entire forward output gear means being located only in said forward gear chamber; a separate reverse countershaft supported on said housing and being located in both said forward and reverse gear chambers; gear means located only in said forward gear chamber connecting said forward and reverse countershafts to drive said reverse countershaft; reverse gear means for operatively connecting said reverse countershaft to said output member only in reverse drive; and said entire reverse gear means located only in said reverse gear chamber.

22. In a transmission; a housing having end walls and a central wall providing separate forward and reverse gear chambers; an input member rotatably supported on the end wall of said forward gear chamber and located in said forward gear chamber; an output member located in both gear chambers rotatably supported on said input member, said central wall and the other end wall; a support shaft nonrotatably mounted on said end wall of said forward gear chamber and said central wall and located only in said forward gear chamber, a forward sleeve countershaft having forward countershaft gears located only in said forward gear chamber rotatably mounted on said support shaft; gear means connecting said input member to drive said forward countershaft; forward output gear means for selectively connecting said countershaft gear to said output member only in a plurality of forward speed ratios; said entire forward output gear means being located only in said forward gear chamber; a support rod nonrotatably mounted on said housing and being located in both said forward and reverse gear chambers, a reverse sleeve countershaft rotatably mounted on said support rod and being located in both said forward and reverse gear chambers; gear means located only in said forward gear chamber on said reverse countershaft meshing with a forward countershaft gear for connecting said forward countershaft to drive said reverse countershaft; reverse gear means for operatively connecting said reverse countershaft to said output member only in reverse drive; and said entire reverse gear means located only in said reverse gear chamber.

References Cited in the file of this patent
UNITED STATES PATENTS
2,892,358    Backus et al. _____ June 30, 1959